(12) United States Patent
Poole et al.

(10) Patent No.: US 9,062,237 B2
(45) Date of Patent: Jun. 23, 2015

(54) REFRIGERANT COMPOSITION

(71) Applicant: RPL Holdings Limited, Altrincham, Cheshire (GB)

(72) Inventors: John Edward Poole, Altrincham (GB); Richard Powell, Bunbury (GB)

(73) Assignee: RPL Holdings Limited, Hale, Altrincham (GB)

( * ) Notice: Subject to any disclaimer, the term of this patent is extended or adjusted under 35 U.S.C. 154(b) by 39 days.

(21) Appl. No.: 13/893,179

(22) Filed: May 13, 2013

(65) Prior Publication Data

US 2014/0158930 A1 Jun. 12, 2014

Related U.S. Application Data

(63) Continuation of application No. 13/118,304, filed on May 27, 2011, now Pat. No. 8,465,664, which is a continuation of application No. 12/281,306, filed as application No. PCT/GB2007/000747 on Mar. 5, 2007, now Pat. No. 7,972,528.

(30) Foreign Application Priority Data

Mar. 3, 2006 (GB) .................................. 0604305.3
Oct. 17, 2006 (GB) .................................. 0620570.2

(51) Int. Cl.
C09K 5/04 (2006.01)

(52) U.S. Cl.
CPC ............. C09K 5/045 (2013.01); *C09K 2205/12* (2013.01)

(58) Field of Classification Search
CPC .......................... C09K 5/045; C09K 2205/122
USPC .......................................................... 252/68
See application file for complete search history.

(56) References Cited

U.S. PATENT DOCUMENTS

| | | | |
|---|---|---|---|
| 4,138,855 A | 2/1979 | Jahan et al. |
| 4,198,313 A | 4/1980 | Bargigia et al. |
| 4,272,960 A | 6/1981 | Wahl, III |
| 4,482,465 A | 11/1984 | Gray |
| 4,810,403 A | 3/1989 | Bivens et al. |
| 4,941,986 A | 7/1990 | Jolly |
| 4,944,890 A | 7/1990 | Deeb et al. |
| 5,026,497 A | 6/1991 | Merchant |
| 5,080,823 A | 1/1992 | Arnaud et al. |
| 5,108,637 A | 4/1992 | Pearson |
| 5,182,040 A | 1/1993 | Bartlett et al. |
| 5,304,320 A | 4/1994 | Barthelemy et al. |
| 5,360,566 A | 11/1994 | Stevenson |
| 5,370,812 A | 12/1994 | Brown |
| 5,417,871 A | 5/1995 | Minor et al. |
| 5,425,890 A | 6/1995 | Yudin et al. |
| 5,458,798 A | 10/1995 | Lunger et al. |
| 5,622,644 A | 4/1997 | Stevenson et al. |
| 5,624,596 A | 4/1997 | Lunger et al. |
| 5,626,790 A | 5/1997 | Minor |
| 5,672,293 A | 9/1997 | Minor et al. |
| 5,685,163 A | 11/1997 | Fujita et al. |
| 5,722,256 A | 3/1998 | Shiflett |
| 5,785,883 A | 7/1998 | Minor et al. |
| 5,954,995 A | 9/1999 | Goble |
| 6,106,740 A | 8/2000 | Powell et al. |
| 6,117,356 A | 9/2000 | Powell et al. |
| 6,526,764 B1 | 3/2003 | Singh et al. |
| 6,604,368 B1 | 8/2003 | Powell et al. |
| 6,629,419 B1 | 10/2003 | Powell et al. |
| 6,783,691 B1 | 8/2004 | Bivens et al. |
| 6,991,743 B2 | 1/2006 | Poole et al. |
| 7,972,528 B2 | 7/2011 | Poole et al. |
| 8,465,664 B2 | 6/2013 | Poole et al. |
| 2003/0001132 A1 | 1/2003 | Lee et al. |
| 2004/0016902 A1 | 1/2004 | Lee et al. |
| 2007/0290163 A1 | 12/2007 | Poole et al. |
| 2009/0224199 A1 | 9/2009 | Poole et al. |
| 2009/0242828 A1 | 10/2009 | Poole et al. |
| 2011/0226983 A1 | 9/2011 | Poole et al. |
| 2012/0312048 A1 | 12/2012 | Poole et al. |

FOREIGN PATENT DOCUMENTS

| | | |
|---|---|---|
| DE | 4116274 | 11/1992 |
| EP | 608164 | 7/1994 |
| EP | 430169 | 8/1994 |
| EP | 565265 | 12/1995 |
| EP | 539952 | 1/1996 |
| EP | 720639 | 6/1997 |
| EP | 779352 | 6/1997 |
| EP | 659862 | 6/1998 |
| EP | 1193305 | 4/2002 |
| EP | 509673 | 11/2003 |
| JP | 04-018484 | 1/1992 |
| JP | 07-173462 | 7/1995 |

(Continued)

OTHER PUBLICATIONS

U.S. Appl. No. 12/281,304, Office Action mailed Oct. 14, 2010.
U.S. Appl. No. 12/281,306, Office Action mailed Mar. 24, 2010.
U.S. Appl. No. 12/281,306, Office Action mailed Oct. 18, 2010.
U.S. Appl. No. 12/281,306, Notice of Allowance mailed Apr. 1, 2011.
U.S. Appl. No. 12/281,304, Office Action mailed Jul. 6, 2011.
U.S. Appl. No. 12/281,304, Office Action mailed Mar. 25, 2011.
U.S. Appl. No. 12/281,304, Office Action mailed Nov. 16, 2011.
U.S. Appl. No. 13/118,304, Office Action mailed Nov. 29, 2011.
U.S. Appl. No. 12/281,304, Office Action mailed May 1, 2012.
U.S. Appl. No. 13/118,304, Office Action mailed Jun. 6, 2012.
U.S. Appl. No. 13/118,304, Office Action mailed Oct. 15, 2012.
U.S. Appl. No. 12/281,304, Office Action mailed Apr. 5, 2013.

(Continued)

*Primary Examiner* — John Hardee
(74) *Attorney, Agent, or Firm* — Weaver Austin Villeneuve & Sampson LLP

(57) ABSTRACT

A refrigerant composition consists essentially of three hydrofluorocarbon components selected from HFC134a, HFC125 and HFC143a and an additive selected from a saturated or unsaturated hydrocarbon or mixture thereof boiling in the range −50° C. and +40° C.

4 Claims, No Drawings

(56) References Cited

FOREIGN PATENT DOCUMENTS

| | | |
|---|---|---|
| JP | 08-143696 | 6/1996 |
| JP | 08-170074 | 7/1996 |
| JP | 09-208940 | 8/1997 |
| JP | 11-181414 | 7/1999 |
| WO | 92/01762 | 2/1992 |
| WO | 92/11339 | 7/1992 |
| WO | 92/16597 | 10/1992 |
| WO | 94/26835 | 5/1994 |
| WO | 96/03472 | 7/1994 |
| WO | 95/08602 | 9/1994 |
| WO | 96/03473 | 7/1995 |
| WO | 97/07179 | 2/1997 |
| WO | 97/15637 | 5/1997 |
| WO | 98/08912 | 3/1998 |
| WO | 99/36485 | 7/1999 |
| WO | 2005/083028 | 9/2005 |
| WO | 2008/113984 | 9/2008 |

OTHER PUBLICATIONS

U.S. Appl. No. 13/118,304, Notice of Allowance mailed May 6, 2013.
U.S. Appl. No. 12/281,304, Notice of Allowance mailed Aug. 21, 2013.
CN patent application No. 201080064491.6, Office Action mailed Apr. 30, 2014.
EP patent application No. 10807634.0, Exam Report mailed Apr. 15, 2013.
U.S. Appl. No. 13/515,798, Office Action mailed Feb. 5, 2015.
U.S. Appl. No. 13/515,798, Notice of Allowance mailed Feb. 23, 2015.

REFRIGERANT COMPOSITION

CROSS REFERENCE TO RELATED APPLICATION

This application is a continuation of prior application Ser. No. 13/118,304 filed on May 27, 2011, now U.S. Pat. No. 8,465,664, which is a continuation of prior application Ser. No. 12/281,306 filed on Aug. 29, 2008, now issued as U.S. Pat. No. 7,972,528, which is a 371 of PCT/GB07/00747 filed Mar. 5, 2007, which claims benefit of GB patent application No. 0604305.3 filed Mar. 3, 2006 and of GB patent application No. 0620570.2 filed Oct. 17, 2006, the disclosures of which are incorporated by reference herein in their entireties.

This invention relates to refrigerant compositions. The invention relates particularly to refrigerant compositions which have no adverse effect on stratospheric ozone. The invention also relates to compositions which are for use both in refrigeration and air conditioning systems designed to use Ozone Depleting Substances (ODS) such as HCFC22 (chlorodifluoromethane) and also for use in new equipment. These refrigerant compositions are compatible with lubricants commonly found in refrigeration and air conditioning systems and also the new synthetic lubricants (eg polyol ester oils).

Although considerable care is taken to prevent leakage of refrigerant to the atmosphere, on occasions this does occur. In some territories the emission of hydrocarbons is regulated to minimise the generation of tropospheric ozone caused by the effect of sunlight on hydrocarbons mixed with oxygen. To minimise the contribution of hydrocarbon to the atmosphere by leakage of the blends which are the subject of this invention, the hydrocarbon content should be preferably less than 5% more preferably less than 3.5%.

The compositions of this invention may also be used in equipment designed for non ozone depleting substances.

It is well known that chlorofluorocarbons (CFCs) such as CFC12 and CFC502 and hydrochlorofluorocarbons such as HCFC22 while being energy efficient, non flammable and of low toxicity, migrate to the stratosphere where they are broken down by ultra violet light to attack the ozone layer. It is desirable to replace these Ozone Depleting Substances by non ozone depleting alternatives such as hydrofluorocarbons (HFCs) which are also non flammable, efficient and of low toxicity. There are six main HFCs, namely HFC134a, HFC32, HFC125, HFC143a, HFC227ea and HFC152a, which either individually or blended into mixtures can replace CFCs and HCFCs. While HFC134a, HFC227ea and HFC152a can be used to replace ODS directly, HFC32, HFC143a, and HFC125 are generally found in blends as replacements for ODS. However, HFCs do not have adequate solubility in traditional lubricants such as mineral and alkylbenzene oils so that synthetic oxygen containing lubricants have been introduced specifically for new equipment. These new lubricants are expensive and hygroscopic.

Refrigerant blends such as R404A, R507, R410A, R407C and others have been commercialised as replacements for CFCs and HCFCs but, because these compositions contain only HFC components, they cannot be used with the traditional lubricants commonly found in use with CFCs and HCFCs. If these blends are to be used to replace CFCs and HCFCs in existing equipment, the major chemical manufacturers recommend that no more than 5% of the traditional lubricant in the system be retained so that a virtually complete change of lubricant to a synthetic oxygen containing lubricant or a full retrofit may be required. This is often costly and technically unsatisfactory.

Although equipment manufacturers have adapted their units to operate with HFC blends, the commercially available products have not been found to be as satisfactory as the CFCs and HCFCs. In particular to ensure adequate oil return, hydrocarbon lubricants, such as mineral oil, have been replaced by oxygen containing lubricants, notably polyol esters and polyalkylene glycols. Unfortunately these materials are liable to absorb atmospheric moisture, especially during maintenance, which can contribute to excessive corrosion and wear in equipment. This can reduce the reliability of the equipment. It is an object of this invention to provide HFC/hydrocarbon blends that enable the continued use of hydrocarbon oils in both existing and new equipment.

In the search for a refrigerant blend that can be readily used to replace R22 in new & existing equipment, it is especially important that the new blend should have an adequate refrigeration capacity. The capacity should be at least 90% of that of the fluid it is replacing, more preferably at least 95% of that of the fluid it is replacing and most preferably equal to or greater than that of the fluid it is replacing under similar operating conditions. This invention relates to refrigerant compositions which have capacities similar to R22 across the range of applications for air conditioning & refrigeration from high to low temperatures where R22 is commonly found.

Some refrigerants, such as R407C, have wide temperature glides (>4° C.) in the evaporator and condenser. Equipment manufacturers, based on their experience with CFC/HCFC single fluids or azeotropes, prefer refrigerants with low glides. A further object of this invention is to provide HFC/hydrocarbon blends that can substitute for HCFC 22 and HFC blends such as R407C in order to allow the continued use of hydrocarbon lubricants in equipment and minimising the temperature glides in the heat exchangers by providing azeotropic and near azeotropic formulations.

Various terms have been used in patent literature to describe refrigerant mixtures. The following definitions are taken from Standard 34 of the American Society of Heating, Refrigerating & Air Conditioning Engineers (ASHRAE);

Azeotrope: an azeotropic blend is one containing two or more refrigerants whose equilibrium vapour and liquid phase compositions are the same at a given pressure. Azeotropic blends exhibit some segregation of components at other conditions. The extent of the segregation depends on the particular azeotrope and the application.

Azeotropic temperature: the temperature at which the liquid and vapour phases of a blend have the same mole fractionation of each component at equilibrium for a specified pressure.

Near azeotrope: a zeotropic blend with a temperature glide sufficiently small that it may be disregarded without consequential error in analysis for a specific application.

Zeotrope: blends comprising multiple components of different volatilities that, when used in refrigeration cycles, change volumetric composition and saturation temperatures as they evaporate (boil) or condense at constant pressure.

Temperature glide: the absolute value of the difference between the starting and ending temperatures of a phase-change process by a refrigerant within a component of a refrigerating system, exclusive of any subcooling or superheating. This term usually describes condensation or evaporation of a zeotrope.

The present invention relates to near azeotropic and zeotropic refrigerant compositions, which are non flammable under all conditions of fractionation as defined under ASHRAE Standard 34, and which can be used to replace ODS in an existing unit without the need to change the lubricant or make any significant change to the system hardware.

In new equipment, the refrigerant compositions allow the continued use of hydrocarbon oils although the unit may be modified to optimise the performance of the new refrigerant, for example by selecting the most appropriate lengths of capillary tubes. Where the ingress of moisture or other problems are experienced with oxygen containing oils, the new compositions allow such oils to be replaced by hydrocarbon oils It is known in the art that the addition of a small amount of hydrocarbon to a refrigerant composition containing an HFC or HFC mixtures can result in sufficient hydrocarbon being dissolved in the lubricant to be transported around the system so that lubrication of the compressor is maintained at all times. It is obvious that the greater the hydrocarbon content of the composition the greater the ability of the refrigerant to transport the lubricant back to the compressor. However, too high a hydrocarbon content can lead to flammable mixtures. Although flammable refrigerants are acceptable in some applications, this invention relates to non flammable compositions for use in equipment where flammable refrigerants are prohibited. However, it is not well understood how to achieve non flammable compositions under all conditions including fractionation of the refrigerant compositions which can take place during a leak of the refrigerant from the system or during storage. Flammability in both the liquid and gaseous phases needs to be considered.

Not all HFCs are non flammable as defined under ASHRAE Standard 34. HFC143a and HFC32 have not received a non flammable rating by ASHRAE. This invention relates to compositions of refrigerants which not only cover blends of non flammable HFCs with hydrocarbons but also blends of flammable HFCs, non flammable HFCs and hydrocarbons in selected proportions selected so that all such compositions are non flammable during fractionation while providing similar refrigerating effects and thermodynamic performances as the ODS and HFC blends they replace.

While this invention relates to refrigerant compositions which can be used with traditional lubricants such as mineral and alkylbenzene oils, they are also suitable for use with synthetic oxygen containing lubricants.

In formulating HFC/hydrocarbon blends to replace HCFC 22 in specific applications, it is sometimes necessary to use one or more lower boiling HFCs, with one or more higher boiling HFCs. In this context preferred lower boiling HFCs are HFC 143a and HFC 125, and the higher boiling HFC is HFC 134a.

To avoid flammability in the blend, or in a fraction generated by a leak, for, example as defined by ASHRAE Standard 34, the total amount of hydrocarbon should be minimised. At the same time the quantity of the hydrocarbon mixture dissolved in the oil needs to be maximised for good oil return, especially at those locations in the circuit where the oil is at its most viscous, for example the evaporator. One of the HFC components of this invention, namely HFC143a, has an ASHRAE safety classification of A2 which makes the amount of HFC143a used and the selection of the hydrocarbon critical to obtaining a non flammable rating of A1 for the blend. A single higher boiling hydrocarbon, such as pentane or iso-pentane, will concentrate in the liquid phase. This is demonstrated by leakage tests conducted on a blend of HFC134a, HFC 125 and pentane as shown in Example 1.

The National Institute for Standards & Technology (NIST) programme Refleak—which is widely used to determine the fractionation of refrigerant blends under all conditions as required by ASHRAE Standard 34—was run for blends comprising HFC134a, HFC143a & R125 with butane and isobutane which produced the results shown in Example 2. Build-up of butane in the liquid phase towards the end of the leakage was significant at over 60% compared to isobutane at about 15%.

Refleak was run also for blends comprising HFC134a, HFC143a & R125 with isobutane only as shown in Example 3. Build-up of isobutane is shown to be considerably less than butane in the liquid phase at worst case fractionation. In patent number EP1238039B1 Roberts teaches away from the inclusion of 2-methyl propane (isobutane) in blends containing HFCs due to flammability concerns at worst case fractionation. Surprisingly it has been found that the use of isobutane in blends containing HFC134a, HFC143a and HFC125 results in non flammability at worst case fractionation under ASHRAE Standard 34.

This invention enables a flammable HFC such as HFC143a to be used in a non flammable refrigerant blend thereby substantively improving its performance, in particular its capacity According to the present invention a refrigerant composition consists essentially of:
a hydrofluorocarbon component consisting of a mixture of:
  R134a, R125 and R143a
and an additive selected from a saturated or unsaturated hydrocarbon or mixture thereof boiling in the range −50° C. and +40° C.

In preferred embodiments the composition consists of a mixture of the hydrofluorocarbon component and the hydrocarbon component so that no substantial amount of any other components or other gases are present.

In a further preferred embodiment the hydrocarbon is present in an amount of 0.1% to 5% and wherein the composition is non-flammable when completely in the vapour phase.

In a further preferred embodiment the hydrocarbon is present in an amount of 0.1 to 5% and wherein when the composition is in a container where both vapour and liquid present, neither vapour nor liquid phase is flammable.

The hydrocarbon additions may be selected from the group consisting of 2-methylpropane, propane, 2,2-dimethylpropane, n-butane, 2-methylbutane, cyclopentane, hexane, ethane, 2-methylpentane, 3-methylpentane, 2,2-dimethylbutane, methylcyclopentane, propene, n-butene, isobutene and mixtures thereof.

In a further embodiment, a refrigerant composition which may find application to replace R22 comprises;
  (i) from about 10 to 35 weight percent of HFC134a, preferably 10 to 25 weight percent of HFC134a; and
  (ii) from about 30 to 79.9 weight percent of HFC125 preferably 46 to 74.7 weight percent of HFC 125; and
  (iii) from about 10 to 30 weight percent of HFC143a, preferably 15 to 25 weight percent of HFC143a; and
  (iv) from about 0.1 to 5 weight percent of butane or isobutane or propane, preferably 0.3 to 4 weight percent of butane or isobutane or propane.

In a further embodiment, a refrigerant composition which may find application to replace R22 comprises:
  (i) from about 10 to 35 weight percent of HFC134a, preferably 10 to 25 weight percent of HFC134a, most preferably 15 to 20 weight percent of HFC134a; and
  (ii) from about 25 to 79.8 weight percent of HFC125 preferably 42 to 74.4 weight percent of HFC 125, most preferably 53 to 67.4 weight percent of HFC 125; and
  (iii) from about 10 to 30 weight percent of HFC143a, preferably 15 to 25 weight percent of HFC143a, and most preferably 17 to 22 weight percent of HFC143a; and (iv) mixtures of butane from about 0.1 to 5 weight percent and isobutane from about 0.1 to 5 weight percent or mixtures of butane (0.1 to 5%) and isopentane (0.1 to 5%) or mixtures of butane (0.1 to 5%) and propane (0.1 to 5%) or mixtures of isobutane (0.1 to 5%) and propane (0.1 to 5%), preferably 0.3 to 4 weight percent of mixtures of butane (0.3 to 4%) and isobutane (0.3 to 4%) or mixtures of butane (0.3 to 4%) and isopentane (0.3 to 4%) or mixtures of butane (0.3 to 4%) and propane (0.3 to 4%) or mixtures of isobutane (0.3 to 4%) and propane (0.3 to 4%), most preferably a mixture of 0.3 to 3 weight percent of isobutane and 0.3 to 2 weight percent of propane or a mixture of 0.3 to 3 weight percent of butane and 0.3 to 2 weight percent of propane.

In a further embodiment, a refrigerant composition which may find application to replace R22 comprises:
(i) from about 10 to 35 weight percent of HFC134a, preferably 10 to 25 weight percent of HFC134a; and
(ii) from about 20 to 79.7 weight percent of HFC125 preferably 38 to 74.1 weight percent of HFC 125; and
(iii) from about 10 to 30 weight percent of HFC143a, preferably 15 to 25 weight percent of HFC143a; and
(iv) mixtures of butane from about 0.1 to 5 weight percent and isobutane from about 0.1 to 5 weight percent and propane from about 0.1 to 5 weight percent, preferably 0.3 to 4 weight percent of mixtures of butane (0.3 to 4%) and isobutane (0.3 to 4%) and propane (0.3 to 4%).

A composition which may find application as a replacement for R22 consists essentially of:

| | |
|---|---|
| R134a | 16% |
| R125 | 60% |
| R143a | 21% |
| Isobutane | 2% |
| Propane | 1% |

Yet another composition which may find application as a replacement for R22 consists essentially of:

| | |
|---|---|
| R134a | 16% |
| R125 | 60% |
| R143a | 21% |
| Butane | 2% |
| Propane | 1% |

A preferred composition consists essentially of:

| | |
|---|---|
| R134a | 10 to 35% |
| R125 | 79.9 to 30% |
| R143a | 10 to 30% |
| Butane | 0.1 to 5% |

A preferred composition consists essentially of:

| | |
|---|---|
| R134a | 10 to 25% |
| R125 | 74.7 to 46% |
| R143a | 15 to 25% |
| Butane | 0.3 to 4% |

A preferred composition consists essentially of:

| | |
|---|---|
| R134a | 10 to 35% |
| R125 | 79.9 to 30% |
| R143a | 10 to 30% |
| Isobutane | 0.1 to 5% |

A preferred composition consists essentially of:

| | |
|---|---|
| R134a | 10 to 25% |
| R125 | 74.7 to 46% |
| R143a | 15 to 25% |
| Isobutane | 0.3 to 4% |

A preferred composition consists essentially of:

| | |
|---|---|
| R134a | 10 to 35% |
| R125 | 79.9 to 30% |
| R143a | 10 to 30% |
| Propane | 0.1 to 5% |

A preferred composition consists essentially of:

| | |
|---|---|
| R134a | 10 to 25% |
| R125 | 74.7 to 46% |
| R143a | 15 to 25% |
| Propane | 0.3 to 4% |

A preferred composition consists essentially of:

| | |
|---|---|
| R134a | 10 to 35% |
| R125 | 79.8 to 25% |
| R143a | 10 to 30% |
| Butane | 0.1 to 5% |
| Isobutane | 0.1 to 5% |

A preferred composition consists essentially of:

| | |
|---|---|
| R134a | 10 to 25% |
| R125 | 74.4 to 42% |
| R143a | 15 to 25% |
| Butane | 0.3 to 4% |
| Isobutane | 0.3 to 4% |

A preferred composition consists essentially of:

| | |
|---|---|
| R134a | 10 to 35% |
| R125 | 79.8 to 25% |
| R143a | 10 to 30% |
| Butane | 0.1 to 5% |
| Isopentane | 0.1 to 5% |

A preferred composition consists essentially of:

| | |
|---|---|
| R134a | 10 to 25% |
| R125 | 74.4 to 42% |
| R143a | 15 to 25% |
| Butane | 0.3 to 4% |
| Isopentane | 0.3 to 4% |

A preferred composition consists essentially of:

| | |
|---|---|
| R134a | 10 to 35% |
| R125 | 79.8 to 25% |
| R143a | 10 to 30% |
| Butane | 0.1 to 5% |
| Propane | 0.1 to 5% |

A preferred composition consists essentially of:

| R134a | 10 to 25% |
|---|---|
| R125 | 74.4 to 42% |
| R143a | 15 to 25% |
| Butane | 0.3 to 4% |
| Propane | 0.3 to 4% |

A preferred composition consists essentially of:

| R134a | 10 to 35% |
|---|---|
| R125 | 79.8 to 25% |
| R143a | 10 to 30% |
| Isobutane | 0.1 to 5% |
| Propane | 0.1 to 5% |

A preferred composition consists essentially of:

| R134a | 10 to 25% |
|---|---|
| R125 | 74.4 to 42% |
| R143a | 15 to 25% |
| Isobutane | 0.3 to 4% |
| Propane | 0.3 to 4% |

A preferred composition consists essentially of:

| R134a | 10 to 35% |
|---|---|
| R125 | 79.7 to 20% |
| R143a | 10 to 30% |
| Butane | 0.1 to 5% |
| Isobutane | 0.1 to 5% |
| Propane | 0.1 to 5% |

A preferred composition consists essentially of:

| R134a | 10 to 25% |
|---|---|
| R125 | 74.1 to 38% |
| R143a | 15 to 25% |
| Butane | 0.3 to 4% |
| Isobutane | 0.3 to 4% |
| Propane | 0.3 to 4% |

A preferred composition consists essentially of:

| R134a | 15 to 20% |
|---|---|
| R125 | 67.4 to 53% |
| R143a | 17 to 22% |
| Isobutane | 0.3 to 3% |
| Propane | 0.3 to 2% |

A preferred composition consists essentially of:

| R134a | 15 to 20% |
|---|---|
| R125 | 67.4 to 53% |
| R143a | 17 to 22% |
| Butane | 0.3 to 3% |
| Propane | 0.3 to 2% |

A preferred composition consists essentially of:

| R134a | 16% |
|---|---|
| R125 | 60% |
| R143a | 21% |
| Isobutane | 2% |
| Propane | 1% |

A preferred composition consists essentially of:

| R134a | 16% |
|---|---|
| R125 | 60% |
| R143a | 21% |
| Butane | 2% |
| Propane | 1% |

In an embodiment the isobutane is present in an amount of 0.6% to 4% and wherein when the composition is in a container where both vapour and liquid present, neither vapour nor liquid phase is flammable.

In a second, preferred embodiment the hydrocarbon is present in an amount of 0.6 to 3.5%.

In a particularly preferred embodiment, a refrigerant composition which may find application to replace R22 comprises:

| R134a | 15.7% |
|---|---|
| R125 | 63% |
| R143a | 18% |
| Butane | 3.3% |

Yet another preferred composition which may find application as a replacement for R22 consists essentially of:

| R134a | 15.8% |
|---|---|
| R125 | 63% |
| R143a | 18% |
| Isobutane | 3.2% |

A further preferred refrigerant composition comprises:

| R134a | 15.9% |
|---|---|
| R125 | 63% |
| R143a | 18% |
| Isobutane | 3.1% |

A preferred refrigerant composition comprises

| R134a | 16% |
|---|---|
| R125 | 63% |
| R143a | 18% |
| Isobutane | 3% |

A further preferred refrigerant composition comprises

| R134a | 16.1% |
|---|---|
| R125 | 63% |
| R143a | 18% |
| Isobutane | 2.9% |

Yet another further preferred refrigerant composition comprises

| R134a | 16.2% |
|---|---|
| R125 | 63% |

-continued

| | |
|---|---|
| R143a | 18% |
| Isobutane | 2.8% |

Another further preferred refrigerant composition comprises

| | |
|---|---|
| R134a | 16.3% |
| R125 | 63% |
| R143a | 18% |
| Isobutane | 2.7% |

A further preferred refrigerant composition comprises

| | |
|---|---|
| R134a | 16.4% |
| R125 | 63% |
| R143a | 18% |
| Isobutane | 2.6% |

Yet another preferred refrigerant composition comprises

| | |
|---|---|
| R134a | 16.5% |
| R125 | 63% |
| R143a | 18% |
| Isobutane | 2.5% |

Another preferred refrigerant composition comprises

| | |
|---|---|
| R134a | 16% |
| R125 | 64% |
| R143a | 18% |
| Isobutane | 2% |

Another preferred refrigerant composition comprises

| | |
|---|---|
| R134a | 15.7% |
| R125 | 65% |
| R143a | 16% |
| Butane | 3.3% |

A further preferred refrigerant composition comprises

| | |
|---|---|
| R134a | 15.8% |
| R125 | 65% |
| R143a | 16% |
| Isobutane | 3.2% |

Yet another further preferred refrigerant composition comprises

| | |
|---|---|
| R134a | 15.9% |
| R125 | 65% |
| R143a | 16% |
| Isobutane | 3.1% |

Yet still another further preferred refrigerant composition comprises

| | |
|---|---|
| R134a | 16% |
| R125 | 65% |

-continued

| | |
|---|---|
| R143a | 16% |
| Isobutane | 3% |

A further preferred refrigerant composition comprises

| | |
|---|---|
| R134a | 16.1% |
| R125 | 65% |
| R143a | 16% |
| Isobutane | 2.9% |

Another preferred refrigerant composition comprises

| | |
|---|---|
| R134a | 16.2% |
| R125 | 65% |
| R143a | 16% |
| Isobutane | 2.8% |

Yet another preferred refrigerant composition comprises

| | |
|---|---|
| R134a | 16.3% |
| R125 | 65% |
| R143a | 16% |
| Isobutane | 2.7% |

Yet still another preferred refrigerant composition comprises

| | |
|---|---|
| R134a | 16.4% |
| R125 | 65% |
| R143a | 16% |
| Isobutane | 2.6% |

A further preferred refrigerant composition comprises

| | |
|---|---|
| R134a | 16.5% |
| R125 | 65% |
| R143a | 16% |
| Isobutane | 2.5% |

Another preferred refrigerant composition comprises

| | |
|---|---|
| R134a | 15.7% |
| R125 | 67% |
| R143a | 14% |
| Butane | 3.3% |

Yet another preferred refrigerant composition comprises

| | |
|---|---|
| R134a | 15.8% |
| R125 | 67% |
| R143a | 14% |
| Isobutane | 3.2% |

Yet still another preferred refrigerant composition comprises

| | |
|---|---|
| R134a | 15.9% |
| R125 | 67% |
| R143a | 14% |
| Isobutane | 3.1% |

A further preferred refrigerant composition comprises

| R134a | 16% |
|---|---|
| R125 | 67% |
| R143a | 14% |
| Isobutane | 3% |

Another preferred refrigerant composition comprises

| R134a | 16.1% |
|---|---|
| R125 | 67% |
| R143a | 14% |
| Isobutane | 2.9% |

Yet another preferred refrigerant composition comprises

| R134a | 16.2% |
|---|---|
| R125 | 67% |
| R143a | 14% |
| Isobutane | 2.8% |

Yet still another preferred refrigerant composition comprises

| R134a | 16.3% |
|---|---|
| R125 | 67% |
| R143a | 14% |
| Isobutane | 2.7% |

A further preferred refrigerant composition comprises

| R134a | 16.4% |
|---|---|
| R125 | 67% |
| R143a | 14% |
| Isobutane | 2.6% |

Another preferred refrigerant composition comprises

| R134a | 16.5% |
|---|---|
| R125 | 67% |
| R143a | 14% |
| Isobutane | 2.5% |

Percentages and other proportions referred to in this specification are by weight unless indicated otherwise and are selected to total 100% from within the ranges disclosed.

The invention is further described by means of examples but not in a limitative sense. The following abbreviations are employed.

AF As Formulated blend composition

WCF Worst Case Formulation: the WCF is defined as the composition containing the highest (percentage) flammable components within the manufacturing tolerance range and the lowest amount of non flammable component.

WCFF Worst Case Fractionated Formulation: when a blend undergoes a leak from a package or system, one or more flammable components may concentrate in the liquid or vapour phases due to fractionation. In order to evaluate properly the possible flammability risk of a blend, the worst case formulation (WCF) composition is submitted to a standard leak test as specified by the ASHRAE 34 protocol. This leak test can either be experimental or simulated using a computer program such as NIST's Refleak.

EXAMPLE 1

A blend containing 88% R134a, 10% R125 and 2% pentane was allowed to undergo a vapour phase leak from a cylinder under isothermal conditions. The weight of the cylinder was monitored and the liquid and vapour phases were analysed by gas-liquid chromatography. The first analysis was made after 2% refrigerant loss. Each subsequent analysis was made after 10% of the refrigerant remaining in the cylinder had leaked as shown in Table 1. The experiment was continued until no liquid remained in the cylinder.

TABLE 1

| LIQUID PHASE | | | | VAPOUR PHASE | | |
|---|---|---|---|---|---|---|
| R134a % Wt | R125 % Wt | Pentane % Wt | Loss % Wt | R134a % Wt | R125 % Wt | Pentane % Wt |
| 88.85 | 8.55 | 2.59 | 2 | 83.20 | 15.06 | 1.74 |
| 87.31 | 10.53 | 2.16 | 10 | 86.45 | 11.33 | 2.22 |
| 90.24 | 6.95 | 2.81 | 10 | 84.79 | 13.38 | 1.84 |
| 90.65 | 6.45 | 2.90 | 10 | 85.83 | 12.23 | 1.95 |
| 90.95 | 6.08 | 2.96 | 10 | 86.88 | 11.07 | 2.04 |
| 91.58 | 5.33 | 3.09 | 10 | 87.44 | 10.50 | 2.05 |
| 91.99 | 4.71 | 3.29 | 10 | 88.19 | 9.67 | 2.14 |
| 91.94 | 4.73 | 3.32 | 10 | 88.72 | 9.12 | 2.16 |
| 92.34 | 4.31 | 3.34 | 10 | 89.73 | 8.14 | 2.21 |
| 92.69 | 3.78 | 2.53 | 10 | 90.17 | 7.49 | 2.34 |
| 93.05 | 3.13 | 3.82 | 10 | 90.59 | 6.95 | 2.46 |
| 92.97 | 3.41 | 3.62 | 10 | 91.28 | 6.43 | 2.29 |
| 93.14 | 2.94 | 3.92 | 10 | 91.56 | 5.98 | 2.46 |
| 93.22 | 2.78 | 4.00 | 10 | 92.07 | 5.48 | 2.45 |
| 93.39 | 2.57 | 4.03 | 10 | 92.48 | 5.00 | 2.52 |
| 93.48 | 2.27 | 4.25 | 10 | 92.76 | 4.63 | 2.61 |
| 93.52 | 2.15 | 4.33 | 10 | 93.13 | 4.13 | 2.74 |
| 92.30 | 1.92 | 4.78 | 10 | 93.33 | 3.98 | 2.69 |
| 93.41 | 1.75 | 4.84 | 10 | 93.39 | 3.56 | 3.04 |
| 93.49 | 1.59 | 4.93 | 10 | 93.69 | 3.28 | 3.03 |
| 93.35 | 1.44 | 5.21 | 10 | 93.83 | 3.02 | 3.15 |
| 93.25 | 1.26 | 5.49 | 10 | 94.12 | 2.81 | 3.07 |
| 93.33 | 1.23 | 5.43 | 10 | 94.19 | 2.54 | 3.26 |
| 93.08 | 1.09 | 5.82 | 10 | 95.25 | 2.40 | 3.35 |
| 92.82 | 1.03 | 6.15 | 10 | 94.69 | 1.44 | 3.86 |
| 92.57 | 0.88 | 6.55 | 10 | 94.43 | 2.00 | 3.57 |
| 92.27 | 0.86 | 6.87 | 10 | 94.24 | 1.85 | 3.91 |
| 92.01 | 0.77 | 7.22 | 10 | 94.44 | 1.68 | 3.87 |
| 91.39 | 0.76 | 7.84 | 10 | 10 | 1.59 | 94.49 |
| 90.62 | 0.58 | 8.79 | 10 | 10 | 0.87 | 94.33 |
| 89.80 | 0.54 | 9.66 | 10 | 10 | 1.31 | 93.91 |
| 87.98 | 0.53 | 11.49 | 10 | 10 | 1.16 | 93.65 |
| 85.42 | 0.45 | 14.13 | 10 | 10 | 1.09 | 93.64 |
| 84.26 | 0.39 | 15.34 | 10 | 10 | 1.02 | 93.31 |
| | | | Liquid empty | | | |

EXAMPLE 2

A blend with an AF composition of 63% R125, 18% 143a, 15.7% R134a and 3.3% isobutane has a WCF composition of 62% R125, 18.9% R143a, 15.7% R134a and 3.4% isobutane. NIST's Refleak programme was used to calculate the fractionation of this WCF blend for a vapour phase isothermal leaks at 54° C. and −34.4° C. The WCFF compositions under these conditions are shown in Table 2.

TABLE 2

| | | | WCFF 54° C. | | WCFF −34.4° C. | |
|---|---|---|---|---|---|---|
| | AF | WCF | Liquid | Vapour | Liquid | Vapour |
| R125 | 63 | 62 | 52.8 | 57.6 | 62 | 70 |
| R143a | 18 | 18.9 | 18.7 | 19 | 18.9 | 18.8 |

TABLE 2-continued

| | AF | WCF | WCFF 54° C. | | WCFF −34.4° C. | |
|---|---|---|---|---|---|---|
| | | | Liquid | Vapour | Liquid | Vapour |
| R134a | 15.7 | 15.7 | 24.7 | 19.8 | 15.7 | 7.4 |
| Isobutane | 3.3 | 3.4 | 3.83 | 3.65 | 3.49 | 3.73 |
| % wt leaked | | | 82 | | 83 | |

EXAMPLE 3

A blend with an AF composition of 63% R125, 18% 143a, 16% R134a 0.6% butane and 2.4% isobutane has a WCF composition of 62% R125, 18.8% R143a, 16% R134a 0.7% butane and 2.5% isobutane. NIST's Refleak programme was used to calculate the fractionation of this WCF blend for a vapour phase isothermal leaks at 54° C. and −34.4° C. The WCFF compositions under these conditions are shown in Table 3.

TABLE 3

| | AF | WCF | WCFF 54° C. | | WCFF −34.4° C. | |
|---|---|---|---|---|---|---|
| | | | Liquid | Vapour | Liquid | Vapour |
| R125 | 63 | 62 | 52.3 | 57.3 | 40.8 | 55.5 |
| R143a | 18 | 18.8 | 18.7 | 18.9 | 16.4 | 19.5 |
| R134a | 16 | 16 | 25.1 | 20.2 | 40.2 | 21.7 |
| Butane | 0.6 | 0.7 | 1.14 | 0.9 | 1.1 | 1.01 |
| Isobutane | 2.4 | 2.5 | 2.81 | 2.67 | 1.49 | 2.29 |
| Total hydrocarbon | 3 | 3.2 | 3.95 | 3.57 | 2.59 | 3.3 |
| % wt leaked | | | 82 | | 83.8 | |

EXAMPLE 4

Blends of R125, R143a, R134a and R600a were evaluated in a typical hermetic or semi-hermetic air conditioner using NIST's CYCLE D program.

| COOLING DUTY DELIVERED | 10 kW |
|---|---|
| EVAPORATOR | |
| Midpoint evaporating temperature | 7° C. |
| Superheating | 5.0° C. |
| Suction line pressure drop (in saturated temperature) | 1.5° C. |
| CONDENSER | |
| Midpoint fluid condensing temperature | 45.0° C. |
| Subcooling | 5.0° C. |
| Discharge line pressure drop (in saturated temperature) | 1.5° C. |
| LIQUID LINE/SUCTION LINE HEAT EXCHANGER | |
| Efficiency | 0.3 |
| COMPRESSOR | |
| Compressor isentropic efficiency | 0.7 |
| Compressor volumetric efficiency | 0.82 |
| Motor efficiency | 0.85 |
| PARASITIC POWER | |
| Evaporator fan | 0.3 kW |
| Condenser fan | 0.4 kW |
| Controls | 0.1 kW |

The results of analysing the performances in an air conditioning unit using these operating parameters are shown in Table 4, plus R22 for comparison.

TABLE 4

| Refrigerant | 1 | 2 | 3 | 4 | 5 | 6 | 7 | 8 |
|---|---|---|---|---|---|---|---|---|
| Weight % 125 | 60.2 | 61.8 | 63 | 63 | 63.2 | 63.5 | 64.2 | 64 |
| Weight % 143a | 19.8 | 18.6 | 18 | 18 | 18 | 18 | 17 | 18 |
| Weight % 134a | 16 | 16 | 15.7 | 16 | 16 | 16 | 16 | 16 |
| Weight % 600a | 4 | 3.6 | 3.3 | 3 | 2.8 | 2.5 | 2.8 | 2 |
| Discharge pressure (bar) | 19.53 | 19.63 | 19.74 | 19.77 | 19.81 | 19.86 | 19.83 | 19.96 |
| Discharge temperature (° C.) | 76.3 | 76.2 | 76.2 | 76.2 | 76.2 | 76.3 | 76.1 | 76.3 |
| COP (system) | 2.42 | 2.42 | 2.41 | 2.41 | 2.41 | 2.41 | 2.41 | 2.41 |
| Capacity (kW/m$^3$) | 3035 | 3046 | 3058 | 3062 | 3066 | 3074 | 3068 | 3085 |
| Glide in evaporator (° C.) | 1.7 | 1.7 | 1.7 | 1.7 | 1.7 | 1.7 | 1.7 | 1.6 |
| Glide in condenser (° C.) | 1.6 | 1.6 | 1.6 | 1.5 | 1.5 | 1.5 | 1.5 | 1.4 |
| Refrigerant | 9 | 10 | 11 | 12 | 13 | 14 | R22 | |
| Weight % 125 | 64.3 | 65.7 | 66.5 | 66.8 | 67.1 | 69.2 | | |
| Weight % 143a | 17.4 | 16.8 | 17.1 | 16.3 | 18.1 | 16.2 | | |
| Weight % 134a | 15.1 | 14.9 | 15.3 | 14.1 | 14 | 14 | | |
| Weight % 600a | 3.2 | 2.6 | 1.1 | 2.8 | 0.8 | 0.6 | | |

TABLE 4-continued

|  | | | | | | | |
|---|---|---|---|---|---|---|---|
| Discharge pressure (bar) | 19.85 | 20.00 | 20.24 | 20.07 | 20.45 | 20.53 | 17.91 |
| Discharge temperature (° C.) | 76.0 | 76.0 | 76.2 | 75.8 | 76.2 | 76.0 | 104.7 |
| COP (system) | 2.41 | 2.41 | 2.40 | 2.41 | 2.40 | 2.40 | 2.49 |
| Capacity (kW/m³) | 3070 | 3088 | 3118 | 3095 | 3142 | 3149 | 3067 |
| Glide in evaporator (° C.) | 1.6 | 1.6 | 1.6 | 1.6 | 1.5 | 1.5 | 0 |
| Glide in condenser (° C.) | 1.5 | 1.4 | 1.3 | 1.4 | 1.2 | 1.2 | 0 |

EXAMPLE 5

Blends of R125, R143a, R134a and R600a were evaluated in a typical open compressor refrigeration unit using NIST's CYCLE D program.

| COOLING DUTY DELIVERED | 10 kW |
|---|---|
| EVAPORATOR | |
| Midpoint evaporating temperature | −30° C. |
| Superheating | 5.0° C. |
| Suction line pressure drop (in saturated temperature) | 1.5° C. |
| CONDENSER | |
| Midpoint fluid condensing temperature | 35.0° C. |
| Subcooling | 5.0° C. |
| Discharge line pressure drop (in saturated temperature) | 1.5° C. |
| LIQUID LINE/SUCTION LINE HEAT EXCHANGER | |
| Efficiency | 0.3 |
| COMPRESSOR | |
| Compressor isentropic efficiency | 0.7 |
| Compressor volumetric efficiency | 0.82 |
| Motor efficiency | 0.85 |
| PARASITIC POWER | |
| Evaporator fan | 0.3 kW |
| Condenser fan | 0.4 kW |
| Controls | 0.1 kW |

The results of analysing the performances in a refrigerator unit using these operating parameters are shown in Table 5, plus R22 and R502 for comparison.

TABLE 5

| Refrigerant | 1 | 2 | 3 | 4 | 5 | 6 | 7 | 8 | 9 |
|---|---|---|---|---|---|---|---|---|---|
| Weight % 125 | 60.2 | 61.8 | 63 | 63 | 63.2 | 63.5 | 64 | 64.2 | 64.3 |
| Weight % 143a | 19.8 | 18.6 | 18 | 18 | 18 | 18 | 18 | 17 | 17.4 |
| Weight % 134a | 16 | 16 | 15.7 | 16 | 16 | 16 | 16 | 16 | 15.1 |
| Weight % 600a | 4 | 3.6 | 3.3 | 3 | 2.8 | 2.5 | 2 | 2.8 | 3.2 |
| Discharge pressure (bar) | 15.34 | 15.42 | 15.51 | 15.52 | 15.55 | 15.60 | 15.67 | 15.57 | 15.59 |
| Discharge temperature (° C.) | 82.9 | 82.8 | 82.7 | 82.8 | 82.9 | 82.9 | 83.0 | 82.7 | 82.5 |
| COP (system) | 1.52 | 1.51 | 1.51 | 1.51 | 1.51 | 1.51 | 1.51 | 1.51 | 1.51 |
| Capacity (kW/m³) | 819 | 822 | 825 | 825 | 827 | 828 | 831 | 826 | 829 |
| Glide in evaporator (° C.) | 1.9 | 1.9 | 1.9 | 1.9 | 1.9 | 1.9 | 1.9 | 1.9 | 1.8 |
| Glide in condenser (° C.) | 1.8 | 1.8 | 1.7 | 1.7 | 1.7 | 1.7 | 1.6 | 1.7 | 1.7 |

| Refrigerant | 10 | 11 | 12 | 13 | 14 | R22 | R502 |
|---|---|---|---|---|---|---|---|
| Weight % 125 | 65.7 | 66.5 | 66.8 | 67.1 | 69.2 | | |
| Weight % 143a | 16.8 | 17.1 | 16.3 | 18.1 | 16.2 | | |
| Weight % 134a | 14.9 | 15.3 | 14.1 | 14 | 14 | | |
| Weight % 600a | 2.6 | 1.1 | 2.8 | 0.8 | 0.6 | | |

TABLE 5-continued

| | | | | | | | |
|---|---|---|---|---|---|---|---|
| Discharge pressure (bar) | 15.71 | 15.89 | 15.77 | 16.06 | 16.12 | 14.07 | 15.46 |
| Discharge temperature (° C.) | 82.5 | 82.9 | 82.2 | 82.8 | 82.6 | 132.4 | 93.5 |
| COP (system) | 1.51 | 1.51 | 1.51 | 1.50 | 1.50 | 1.60 | 1.55 |
| Capacity (kW/m$^3$) | 834 | 840 | 837 | 849 | 850 | 872 | 907 |
| Glide in evaporator (° C.) | 1.8 | 1.9 | 1.8 | 1.8 | 1.8 | 0.0 | 0.1 |
| Glide in condenser (° C.) | 1.6 | 1.5 | 1.6 | 1.4 | 1.4 | 0.0 | 0.0 |

The invention claimed is:

1. A refrigerant composition consisting essentially of a refrigerant consisting of:

a non-flammable combination of hydrofluorocarbon and hydrocarbon components formulated as a replacement for chlorofluorocarbon refrigerant R22, consisting of a mixture of:

| | |
|---|---|
| R134a | 10 to 25% |
| R125 | 74.7 to 46% |
| R143a | 15 to 25% |
| butane | 0.3 to 4% | wherein the composition is contained in an air conditioning or refrigeration unit with a hydrocarbon or oxygen-containing lubricant.

2. A refrigerant composition as claimed in claim 1 wherein the refrigerant consists of:

| | |
|---|---|
| R134a | 15.7% |
| R125 | 63% |
| R143a | 18% |
| butane | 3.3%. |

3. A refrigerant composition as claimed in claim 1 wherein the refrigerant consists of:

| | |
|---|---|
| R134a | 15.7% |
| R125 | 65% |
| R143a | 16% |
| butane | 3.3%. |

4. A refrigerant composition as claimed in claim 1 wherein the refrigerant consists of:

| | |
|---|---|
| R134a | 15.7% |
| R125 | 67% |
| R143a | 14% |
| butane | 3.3%. |

\* \* \* \* \*